United States Patent [19]
Wittig

[11] Patent Number: 4,930,841
[45] Date of Patent: Jun. 5, 1990

[54] BACK-REST ADJUSTER WITH A FREE PIVOT DEVICE

[75] Inventor: Werner Wittig, Winnweiler, Fed. Rep. of Germany

[73] Assignee: Keiper Recaro GmbH & Co., Fed. Rep. of Germany

[21] Appl. No.: 352,891

[22] Filed: May 17, 1989

[30] Foreign Application Priority Data

May 18, 1988 [DE] Fed. Rep. of Germany ....... 3816833

[51] Int. Cl.$^5$ .............................................. B60N 1/04
[52] U.S. Cl. .................................... 297/379; 297/362; 297/364
[58] Field of Search .............................. 297/362–365, 297/379

[56] References Cited

U.S. PATENT DOCUMENTS

| 4,502,730 | 3/1985 | Karaska et al. | 297/379 X |
| 4,660,886 | 4/1987 | Terado et al. | 297/364 X |
| 4,773,704 | 9/1988 | Engels | 297/365 X |

FOREIGN PATENT DOCUMENTS 1365920  9/1974  United Kingdom ................ 297/363

*Primary Examiner*—Peter R. Brown
*Attorney, Agent, or Firm*—Wigman & Cohen

[57] ABSTRACT

A back-rest adjuster with a free pivot device for a vehicle seat comprises between a drive device and the gearing which adjusts the fitting parts (5, 6) in relation to each other a shiftable clutch which has to be released for free pivoting and which comprises two clutch parts (13, 14) adpated for movement in an axial direction and in relation to each other. Associated with one clutch part and adapted for movement together with and disposed concentrically in relation to it is a memory ring (15) disposed between a drive ring (19) which is non-rotatable in relation to one fitting part (6) and a ratchet ring (21) which is non-rotatable in relation to the other fitting part (5). The memory ring (15) and the drive ring (19) which, when the clutch is released, are capable of limited rotation in relation to each other, are form-lockingly coupled to each other only in one single position at the end of the range of rotation, when the clutch is closed. When the clutch is released, the memory ring (15) is in any rotary position capable of being form-lockingly coupled to the ratchet ring (21) which is non-rotatable in relation to the other fitting part (5).

10 Claims, 3 Drawing Sheets

BACK-REST ADJUSTER WITH A FREE PIVOT DEVICE

The invention relates to a back-rest adjuster with a free pivot device for a motor vehicle seat.

Motor vehicle seats, of which the back-rest is adjustable not only in its angle of rake but which can also be folded forwards, usually have hinge fittings, the bottom fitting part of which is connected to the seat frame in such a way that it is pivotable about an additional axis parallel with the pivoting axis of the fi(ting, a locking means connecting the lower fitting part in non-pivoting fashion to the seat frame when the seat is locked. When the locking device is released, since the folding movement of the back-rest takes place without any pivoting of the two fitting parts in relation to each other, it is ensured that the back-rest resumes irs original angle of inclination again when the lower fitting part is again in the lockable starting position.

However, since such hinge fittings have their drawbacks, hinge fittings are also used in which, thanks to a free pivoting device, the back-rest can be folded forwards about that pivoting axis about which the back-rest is moved when the angle of rake is altered by means of the gearing which connects the two fitting parts. These hinge fittings are, however, above all very expensive if they make it possible when folding back the back rest, to lock it again in the starting position.

Therefore, the invention is based on the problem of providing a back-rest adjuster which has only one single axis, is structurally simple and thus inexpensive although at the same time it makes it possible to lock the back-rest in the starting position when it is folded back. This problem is resolved by a back-rest adjuster in accordance with the claimed invention.

In order to be able to fold the back-rest forwards, all that is necessary with this back-rest adjuster is to separate the clutch. The upper fitting part can then be pivoted in relation to the lower fitting part. Since simultaneously with separation of the clutch, a form-locking connection between the memory ring and one of the two fitting parts is separated while a form-locking connection is established with the other fitting part, then the angle through which the memory ring is pivoted in relation to the first-mentioned fitting part corresponds exactly to the angle through which the back-rest is folded. Furthermore, since the form-locking connection between the memory ring and the first-mentioned fitting part is provided at the end of a range of rotation of the memory ring, it is guaranteed that when the back-rest is folded back as far as the end of the range of rotation of the memory ring, the back-rest will again be in its starting position and the form-locking connection will have been restored between the memory ring and that fitting part in relation to which the memory ring moves during the folding movement of the backrest. By the restoration of this form-locking connection, while at the same time releasing the form-locking connection with the other fitting part, the coupling is furthermore engaged so that the mobility of the back-rest is again limited to pivoting by means of the drive device.

In the case of a preferred form of embodiment, by reason of the fact that the memory ring is spring-loaded, it is possible in this respect to achieve an automatic re-engagement of the catch on the memory ring into the associated depression on the drive ring, as soon as the back-rest which is being folded back has reached the starting position, the abutment for the projection preventing the back-rest being folded rearwardly beyond this position. A structurally particularly advantageous development of this abutment is also provided in accordance with the invention.

The form-locking connection between the memory ring and the ratchet ring is preferably constructed such that the ratchet teeth may be of different shapes. They can, for example, be rectangular, triangular or arcuate teeth and have correspondingly constructed grooves.

The spring loading of the memory ring and of the ratchet ring is another aspect of the present invention.

For the purpose of axial displacement of the memory ring and of one part of the coupling, in the case of a preferred embodiment, the memory ring has on its outer circumference an annular collar or an annular groove for an axially directed form-locking connection to an actuating member.

The invention will be explained in detail hereinafter with reference to an example of embodiment shown in the accompanying drawings, in which.

Figure 3:
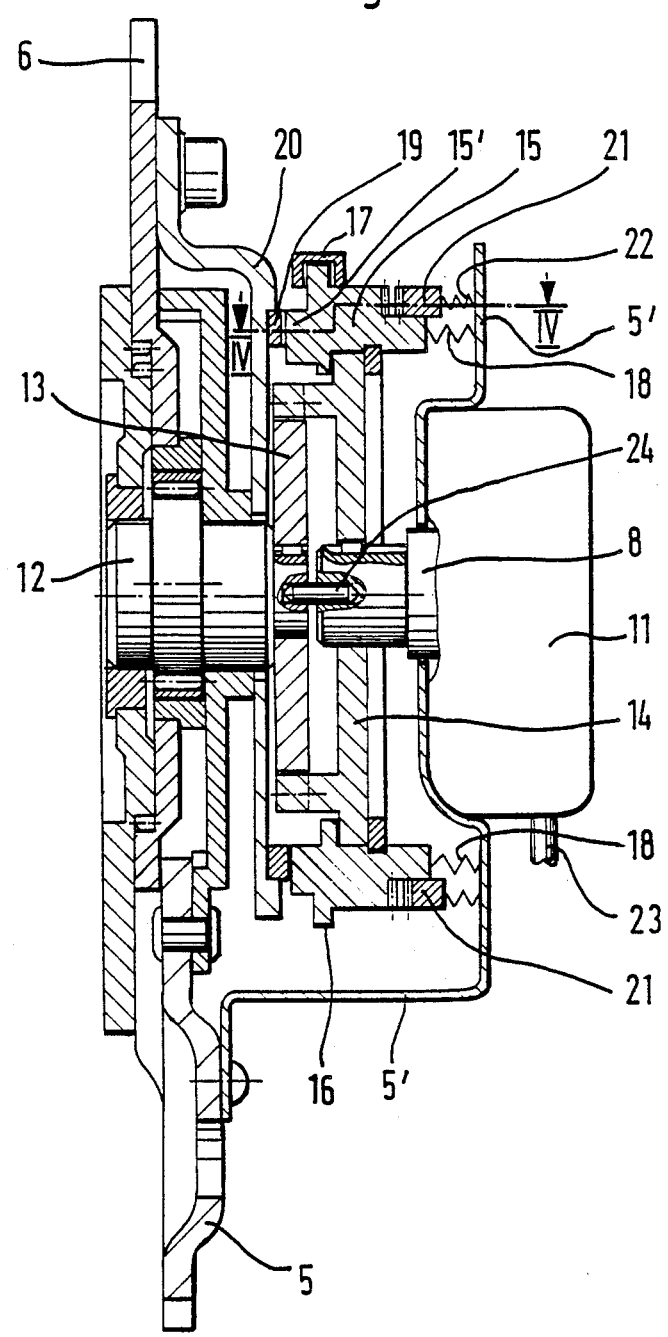
Figure 4:
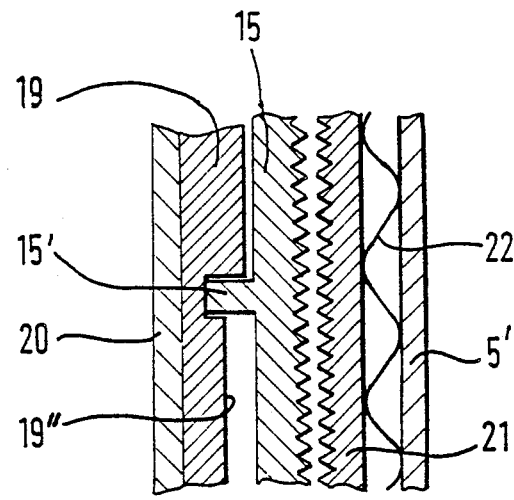
Figure 5:
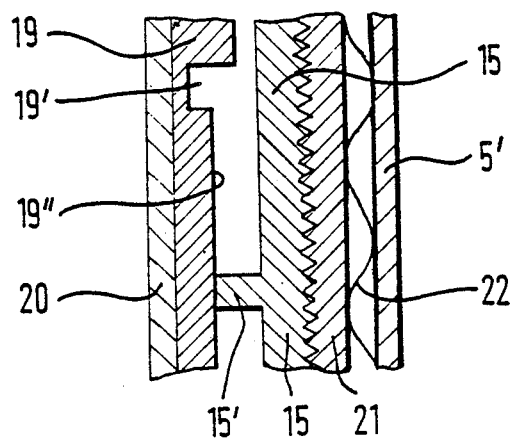

FIG. 3 an incomplete and simplified longitudinal section through the embodiment;

FIG. 4 is an incompletely shown development of a cross-section taken along the line IV—IV in FIG. 3 concentrically of the hinge pin and when the clutch is locked, and FIG. 5 is a development corresponding to FIG. 4 when the clutch is released.

The back-rest 2 of a motor vehicle seat generally designated 1 is on both sides connected to the seat part 4 by respective hinge fitting 3. The hinge fitting 3 comprises a lower fitting part 5 which is rigidly connected to the seat part 4, and an upper fitting part 6 which is rigidly connected to the padding carrier member 7 of the back-rest 2. A hinge pin 12 which pivotably connects the lower fitting part 5 to the upper fitting part 6 defines the axis about which the back-rest 2 can be adjusted in relation to the seat part 4 in terms of its angle of rake and can be folded forwardly upon actuation of a release lever 9 provided laterally on the back-rest 2.

The upper fitting part 6 is connected to the lower fitting part 5 by a non-self-locking epicyclic gear system, the central wheel of which is constructed in one piece with one fitting part while the planet wheel is constructed in one piece with the other fitting part, the gears being mounted on mutually eccentric portions of the hinge pin 12.

Figure 1:
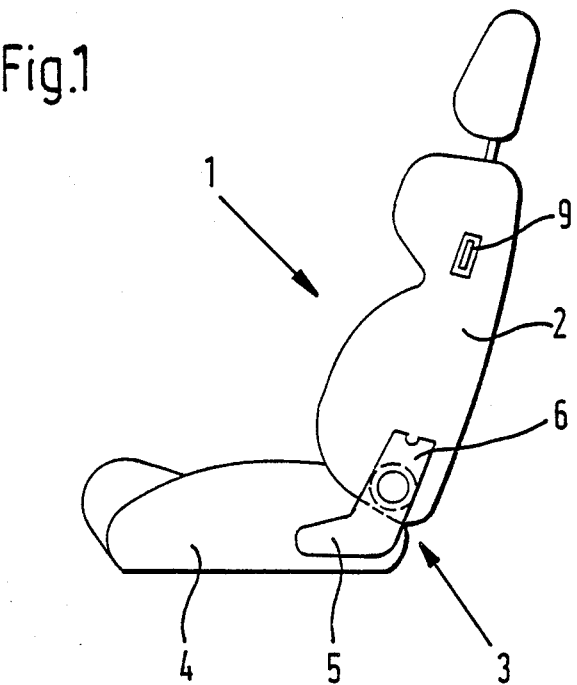
FIG. 1 is a diagrammatic side view of a motor vehicle seat incorporating the embodiment.
Figure 2:
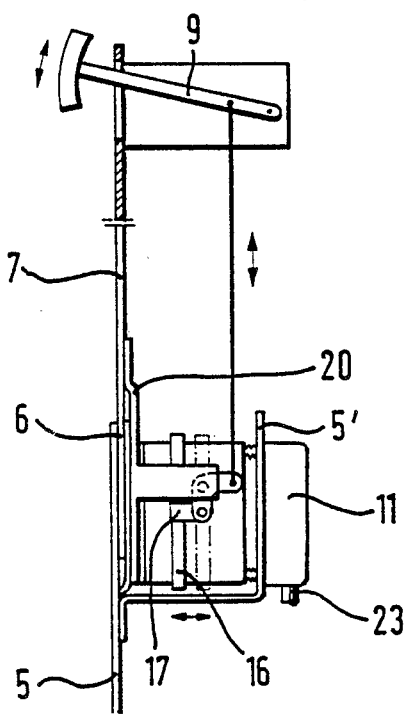
FIG. 2 is a simplified view of the embodiment.

As FIG. 2 shows, mounted on a support 5' which is rigidly connected to the fitting part 5 and which has one leg parallel with and at a distance from the fItting part Is a self-locking reduction gearing 11, the output shaft 8 of which is in line with the hinge pin 12, the alignment in the example of embodiment shown being ensured by a centring pin 24 which centrally penetrates both the output shaft 8 and also the hinge pin. As FIG. 3 shows, on the end portion of the output shaft 8 which points towards the hinge pin 12 a first clutch part 14 is non-rotatably but axially displaceably disposed and carries axially projecting dogs. A second clutch part 13 which together with the first clutch part 14 constitutes a shiftable clutch, is disposed on that end portion of the hinge pin 12 which points towards the output shaft 8 and on its periphery it has a system of alternating recesses and dogs resembling a kind of external tooth system. The recesses engage with the dogs on the first clutch part 14.

A memory ring 15 is rotatably mounted on the first clutch part 14 although in an axial direction it cannot be moved in relation to the said clutch part. The memory ring comprises, projecting beyond its outer generatrix an annular collar 16 which engages a shift fork 17 shown offset in a peripheral direction in FIG. 3 and which, as FIG. 2 shows, is pivotably mounted on an arm projecting from a component 20 which is rigidly connected to the upper fitting part 6. The shift fork 7 can be pivoted by means of the release lever 9, in fact in such a way that when the release lever 9 is raised, the memory ring 15 and with it the first clutch part 14 are pushed away from the second clutch part 13. As soon as the dogs on the first clutch part 14 become disengaged from the dogs on the second clutch part 13, the back-rest 2 can be folded forwards since then the hinge pin 12 is uncoupled from the output shaft 8 which is secured against rotation by the reduction gearing 11.

Disposed between the memory ring 15 and that leg of the support 5' which is parallel with it there is at least one pretensioned spring 18 which seeks to maintain the memory ring 15 in that position in which the clutch is closed. In this position, two peripherally staggered dog-like projections 15' which project beyond that end face of the memory ring which is remote from the spring 18, are form-lockingly engaged with a respective corresponding groove 19' in that end face of a driving ring 19 which is towards the memory ring 15 and which is orientated at the memory ring 15 and is rigidly connected to the component 20. As FIGS. 4 and 5 show, the end face of the drive ring 19 which is towards the memory ring 15 comprises an axial step at the point where the groove 19' is provided. One flank of the groove 19' is therefore higher than the other flank by the size of the step. If the clutch is engaged then between that end face of the memory ring 15 which is towards the drive ring 19 and that portion of the memory ring 19 which projects farther forwards by reason of the step, there is certainly a small gap while between the memory ring 15 and the axially shorter portion, the intermediate space in the example of embodiment shown is about equal to half the height of the projections 15'.

As FIG. 3 shows, there is disposed on the same axis as the memory ring 15, between this latter and the leg of the support 5' which is parallel with it, a ratchet ring 21 biased on the support 5' via a pretensioned spring 22 which may be a corrugated spring, as in the case of the spring 18. The ratchet ring 21 has a travel limiter, being displaceable in an axial direction although being non-rotatably connected thereto. As especially FIGS. 4 and 5 show, the ratchet ring 21 has on its face which is towards the memory ring 15 a system of teeth corresponding to the tooth system of the memory ring 15 facing them.

As Fig. 4 shows, the teeth on the ratchet ring 21 and on the memory ring 15 are disengaged when the clutch is closed. Since in this shift condition of the clutch the memory ring 15, by virtue of its two projections 15' engaging the grooves 19' of the drive ring 19, is non-rotatably connected to the back-rest 2, when there is an adjustment of the back-rest by virtue of the fact that a motor' not shown' acts via a flexible shaft 23, the transmission gearing 11, the output shaft 8, the two clutch parts 13 and 14, the hinge pin 12 and the epicyclic gear, pivoting the upper fitting part 6 in relation to the lower fitting part 5, then the memory ring rotates through the same angle. Therefore, upon an adjustment of the angle of rake of the backrest 2, the memory ring 15 retains its angular position in respect of the back-rest 2. If the back-rest 2 is to be folded forwards, then raising the release lever 9 displaces the memory ring 15 towards that leg of the support 5' which is parallel with it sufficiently that the second part 13 of the clutch is lifted out of the first clutch part 14 and for the two projections 15' to be lifted out of their associated grooves 19'. As Fig. 5 shows, the projections 15' are, however, only lifted out sufficiently that they can pass that portion of the end face 19" which is adjacent the lower flank of the grooves 19'. Upon this axial displacement of the memory ring 15, the teeth thereon engage the teeth of the ratchet ring 21 which is in the process pushed somewhat towards the support 5' against the force of the spring 22, so guaranteeing reliable engagement of the teeth.

If, now, the back-rest 2 is folded forwards then the end face 19" moves into a position in which it is aligned on the end face of the two projections 15', as FIG. 5 shows. Therefore, the release lever 9 can now be released. The spring 22 can, in fact, push the ratchet ring 21 and the memory ring 15 which is in engagement with it towards the drive ring 19 but only until such time as the projections 15' are bearing on the end face 19".

When the back-rest 2 is folded back again, then it can only be moved to that position in which the high side of the grooves 19' comes to bear on the associated projections 15'. Therefore, each of these flanks forms an abutment to limit the range of movement of the back-rest rearwardly during a free pivoting process. The position in which the two grooves 19' are orientated at the projections 15' associated with then is exactly that position out of which the back-rest has been folded forwards because the memory ring 15 has not altered its position during the folding process. The spring 18 then pushes the memory ring 15 towards the drive ring 19 so bringing the projections 15' into re-engagement with the grooves 19'. At this stage, the first clutch part 14 is likewise automatically brought into engagement with the second clutch part 13, so that it is again possible to use the drive motor to pivot the back-rest.

All the features mentioned in the foregoing description or to be ascertained solely from the drawings must be regarded as further developments and constituent parts of the invention even if they have not been especially stressed and particularly even if they are not mentioned in the claims.

What is claimed is:

1. A back rest adjuster with a free pivot device for a motor vehicle and comprising a lower fitting part to be connected to the seat frame and an upper fitting part to be connected to the back-rest, the two fitting parts being connected pivotally to each other by a hinge pin defining the pivot axis of the back-rest, and comprising a self-locking gearing, the input of which is to be coupled to a drive device while its output shaft can be connected to the upper fitting part via a torque transmitting means, characterized in that
    (a) the torque transmitting means comprises a shiftable clutch which has to be disengaged to allow free pivoting and which comprises a first clutch part coupled to the output shaft of the gearing and a second clutch part mounted on the hinge pin, said two clutch parts adapted for movement in an axial direction in relation to each other;

(b) the first clutch part, which has to be moved from a shift in the direction of its axis of rotation, is associated with a memory ring adapted for movement together with and disposed concentrically of said first clutch part, the said memory ring being disposed between a drive ring which is non-rotatable in relation to the upper fitting part and a ratchet ring which is non-rotatable in relation to the lower fitting part whereby during pivoting of the upper clutch part the memory ring rotates together with the upper fitting part when the clutch is engaged, and remains stationary when the clutch is disengaged;

(c) the memory and the drive ring which, when the clutch is disengaged, are to a limited degree rotatable in relation to each other, are form-lockingly coupled to each other only in one single position at the end of the range of rotation when the clutch is engaged, whereby when the back-rest is folded back, the upper fitting part is stopped in the same position in which it is started for folding; and (d) when the clutch is disengaged, the memory ring can in any rotary position be coupled in form-locking fashion to the ratchet ring which is non-rotatable in relation to the lower fitting part.

2. A back-rest adjuster according to claim 1, characterized in that the memory ring is rotatably but axially non-displaceably connected to the first clutch part.

3. The back-rest adjuster according to claim 2 wherein the memory ring is disposed or the first clutch part.

4. A back-rest adjuster according to claim 1, characterized in that the memory ring comprises at least one catch pointing towards the drive ring while the drive ring has for a peripherally form-locking housing of this catch one single depression formed in a surface of the drive ring which faces a surface of the memory ring from which the catch protrudes, one flank of this depression facing an abutment, formed on said surface of the drive ring, which co-operates with the catch, whereby the only position is defined in which the memory ring will be coupled in a form-locking manner with the drive ring and the upper fitting part.

5. A back-rest adjuster according to claim 4, characterized in that the abutment is formed by a step projecting towards the memory ring and disposed at one end of a slideway for the catch and facing the memory ring.

6. A back-rest adjuster according to claim 1, characterized in that the memory ring and the ratchet ring each have formed on the mutually facing sides thereof respective ring gears with respectively corresponding teeth.

7. A back-rest adjuster according to claim 1, characterized in that the memory ring is spring loaded in the direction of the drive ring.

8. A back-rest adjuster according to claim 1, characterized in that the ratchet ring is biased on the lower fitting part through at least one interposed spring.

9. A back-rest adjuster according to claim 1, characterized in that the memory ring is provided on its outer periphery with an annular form-locking means providing an axially form-locking connection to an actuation member.

10. A back-rest adjuster according to claim 1, characterized in that the second clutch part is mounted on the drive shaft of a non-self locking gearing which couples the two fitting parts to each other while the first clutch part is disposed on the output shaft of the self-locking gearing.

* * * * *